US006995851B2

(12) United States Patent
Sakamoto

(10) Patent No.: US 6,995,851 B2
(45) Date of Patent: Feb. 7, 2006

(54) PRINTER APPARATUS, CONTROL METHOD AND CONTROL PROGRAM THEREFOR, AND COMPUTER-READABLE STORAGE MEDIUM CONTAINING THE CONTROL PROGRAM

(75) Inventor: Kazuya Sakamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1151 days.

(21) Appl. No.: 09/843,722

(22) Filed: Apr. 30, 2001

(65) Prior Publication Data

US 2001/0035974 A1    Nov. 1, 2001

(30) Foreign Application Priority Data

Apr. 28, 2000  (JP)  ............................. 2000-129250
Mar. 8, 2001   (JP)  ............................. 2001-064222

(51) Int. Cl.
*G06F 15/00*    (2006.01)
(52) U.S. Cl. .................. 358/1.14; 358/1.15; 358/437; 710/8; 710/15; 710/62; 710/305; 710/313
(58) Field of Classification Search .............. 358/1.14, 358/1.15, 437; 710/8, 15, 62, 305, 313
See application file for complete search history.

(56) References Cited

U.S. PATENT DOCUMENTS

| | | | | |
|---|---|---|---|---|
| 5,970,141 A | * | 10/1999 | Bennett et al. | 704/270 |
| 6,028,985 A | * | 2/2000 | Okuyama | 358/1.15 |
| 6,055,062 A | * | 4/2000 | Dina et al. | 358/1.13 |
| 2001/0021039 A1 | * | 9/2001 | Oyanagi et al. | 358/1.16 |

FOREIGN PATENT DOCUMENTS

| | | |
|---|---|---|
| EP | 0 859 497 A2 | 8/1998 |
| JP | 11-167474 A | 6/1999 |
| JP | 11-327858 A | 11/1999 |

* cited by examiner

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

A printer apparatus terminates printing and discharges paper when an interface is disconnected during a printing process, whereby the next print data is received and is appropriately printed. In particular, when a printer apparatus that selectively uses a plurality of interfaces to receive print data from one of plurality of host units so that the print data can be printed by a single printing mechanism has an error such as interface disconnection during a process for printing print data received via the selected interface, the printer apparatus terminates the printing and discharges paper, whereby when print data is received via another interface and is printed, the printing can be smoothly performed without requiring the user to perform any operation.

3 Claims, 4 Drawing Sheets

PRINTER APPARATUS, CONTROL METHOD AND CONTROL PROGRAM THEREFOR, AND COMPUTER-READABLE STORAGE MEDIUM CONTAINING THE CONTROL PROGRAM

BACKGROUND OF THE INVENTION

1. Field of the Invention

The present invention relates to a printer apparatus that is linked to an external host unit via a predetermined interface and that prints data received from the host unit on cut-sheet paper, a control method and control program used for the printer apparatus, and a computer-readable storage medium containing the control program.

2. Description of the Related Art

Conventionally, if a cable for the interface with the host unit is disconnected, in other words, the interface link is broken while the above printer apparatus (hereinafter also referred to simply as the "printer") is printing the print data, the printer cannot detect and notify the situation to the user of the printer. In this situation, the printer cannot receive the print data (including control commands) during a printing process, and the printer performs the printing of print data remaining in a receiving buffer that temporarily stores the received print data. In many cases, in the remaining print data, print data for the last page is not completely printed, and the printer does not receive a paper-discharge command to discharge the last page. Accordingly, in many cases, disconnection of the interface cable during the printing process causes the printer to terminate printing without discharging the sheet of paper on which the print data for the last page is printed.

To solve this defect, conventional types of printers are designed so that, when the printer detects a sheet of paper remaining on a paper-feeding path in the printer, it starts printing after initially discharging the remaining sheet. However, depending on the arrangement of a paper-feeding path and paper sensors, it is impossible for a particular type of printer to distinguish between a state in which a sheet of paper remains on the paper-feeding path and a state in which a sheet of paper is inserted in a manual feeder unit. Thus, these particular types of printers are not designed not to perform the initial discharging of paper when paper is manually fed for printing.

As for the conventional printer, a type of construction is known in which a plurality of interfaces are used to link the printer to a plurality of host units, and print data from the host units can be printed by a single printing mechanism by switching the interfaces to select one interface.

In the above-described construction, if a cable for the interface is disconnected, while printing print data received from one host unit via one interface, the printing is interrupted as described above, and the sheet of paper on which a portion of the remaining print data for the last page is printed is not discharged. In this state, in a case in which print data is received from another host unit via another interface and is printed, if a normal paper-feeding mode is activated in which paper is fed from a paper-feeding cassette, the automatic discharge of the remaining sheet of paper is initially performed, and the printer can perform printing without any trouble.

Nevertheless, when print data from another host unit is printed while paper is fed manually by the user, initial discharge of the remaining sheet may not be performed depending on the type of printer. In this case, the remaining sheet for the last page must be discharged by operating the operation panel of the printer in advance. Otherwise, the user must extract the remaining sheet in the case of a printer that cannot be instructed to discharge the paper by operating the operation panel of the printer.

If the user starts printing in which paper is fed manually by the user without being aware of the remaining sheet for the last page, the printing is started from a portion other than the beginning of the remaining sheet, and results in a failure.

SUMMARY OF THE INVENTION

Accordingly, it is an object of the present invention to provide a printer which prevents the foregoing problems from occurring and in which, even if an interface is disconnected while printing is being performed, the printer terminates printing and discharges the paper, such that print data which is received after the disconnection has occurred can be printed. In particular, when the printer detects an error such as the disconnection of the interface, while the printer is printing print data received via one interface, the printer appropriately copes with this situation, and when the printer performs the printing of print data received via another interface with the paper being fed manually by the user, the printer does not require the user to perform initial paper-discharge operations or to extract a remaining sheet of paper as in a conventional type of printer. The printer also performs printing without fail.

To this end, according to an aspect of the present invention, the foregoing object is achieved through provision of a printer apparatus including a detection unit for detecting an interface-disconnection state, and a control unit for performing control processing in which, when the detection unit detects the interface-disconnection state during a printing process, the printing is terminated and paper is discharged.

According to another aspect of the present invention, the foregoing object is achieved through provision of a method for controlling a printer apparatus, including a detection step for detecting an interface-disconnection state during a printing process, and a control step for performing control processing in which, when the detection step detects the interface-disconnection state during the printing process, the printing is terminated and paper is discharged.

According to another aspect of the present invention, the foregoing object is achieved through provision of a control program readable by a computer provided in a printer apparatus. The control program includes a detection step for detecting an interface-disconnection state during a printing process, and a control step for performing control processing in which, when the detection step detects the interface-disconnection state during the printing process, the printing is terminated and paper is discharged.

According to another aspect of the present invention, the foregoing object is achieved through provision of a storage medium containing a control program readable by a computer provided in a printer apparatus. The control program includes a detection step for detecting an interface-disconnection state, and a control step for performing control processing in which, when the detection step detects the interface-disconnection state during a printing process, the printing is terminated and paper is discharged.

According to another aspect of the present invention, the foregoing object is achieved through provision of a printer apparatus including a plurality of interfaces by which the printer apparatus is linked to a plurality of host units and which are selectively used so that print data is received from one of the host units and is printed on cut-sheet paper by a single printing mechanism, a detection unit for detecting an error state in the selected interface, and a control unit for performing control processing in which, when the detection unit detects the error state in the selected interface during the printing process, the printing is terminated and the printed paper is discharged.

According to another aspect of the present invention, the foregoing object is achieved through provision of a method for controlling a printer apparatus including a plurality of interfaces by which the printer apparatus is linked to a plurality of host units and which are selectively used so that print data is received from one of the host units and is printed on cut-sheet paper by a single printing mechanism. The method includes a detection step for detecting an error state of the selected interface during a printing process, and a control step for performing control processing in which, when the detection step detects the interface-error state during the printing process, the printing is terminated and paper is discharged.

According to another aspect of the present invention, the foregoing object is achieved through provision of a computer-readable storage medium containing a program for controlling a printer apparatus including a plurality of interfaces by which the printer apparatus is linked to a plurality of host units and which are selectively used so that print data is received from one of the host units and is printed on cut-sheet paper by a single printing mechanism. The program includes a detection step for detecting an error state of the selected interface during a printing process, and a control step for performing control processing in which, when the detection step detects the interface-error state during the printing process, the printing is terminated and paper is discharged.

According to another aspect of the present invention, the foregoing object is achieved through provision of a control program readable by a computer provided in a printer apparatus including a plurality of interfaces by which the printer apparatus is linked to a plurality of host units and which are selectively used so that print data is received from one of the host units and is printed on cut-sheet paper by a single printing mechanism. The control program includes a detection step for detecting an error state of the selected interface during a printing process, and a control step for performing control processing in which, when the detection step detects the interface-error state during the printing process, the printing is terminated and paper is discharged.

Further objects, features and advantages of the present invention will become apparent from the following description of the preferred embodiments with reference to the attached drawings.

DESCRIPTION OF THE PREFERRED EMBODIMENTS

An embodiment of the present invention is described below with reference to the accompanying drawings.

Figure 1:
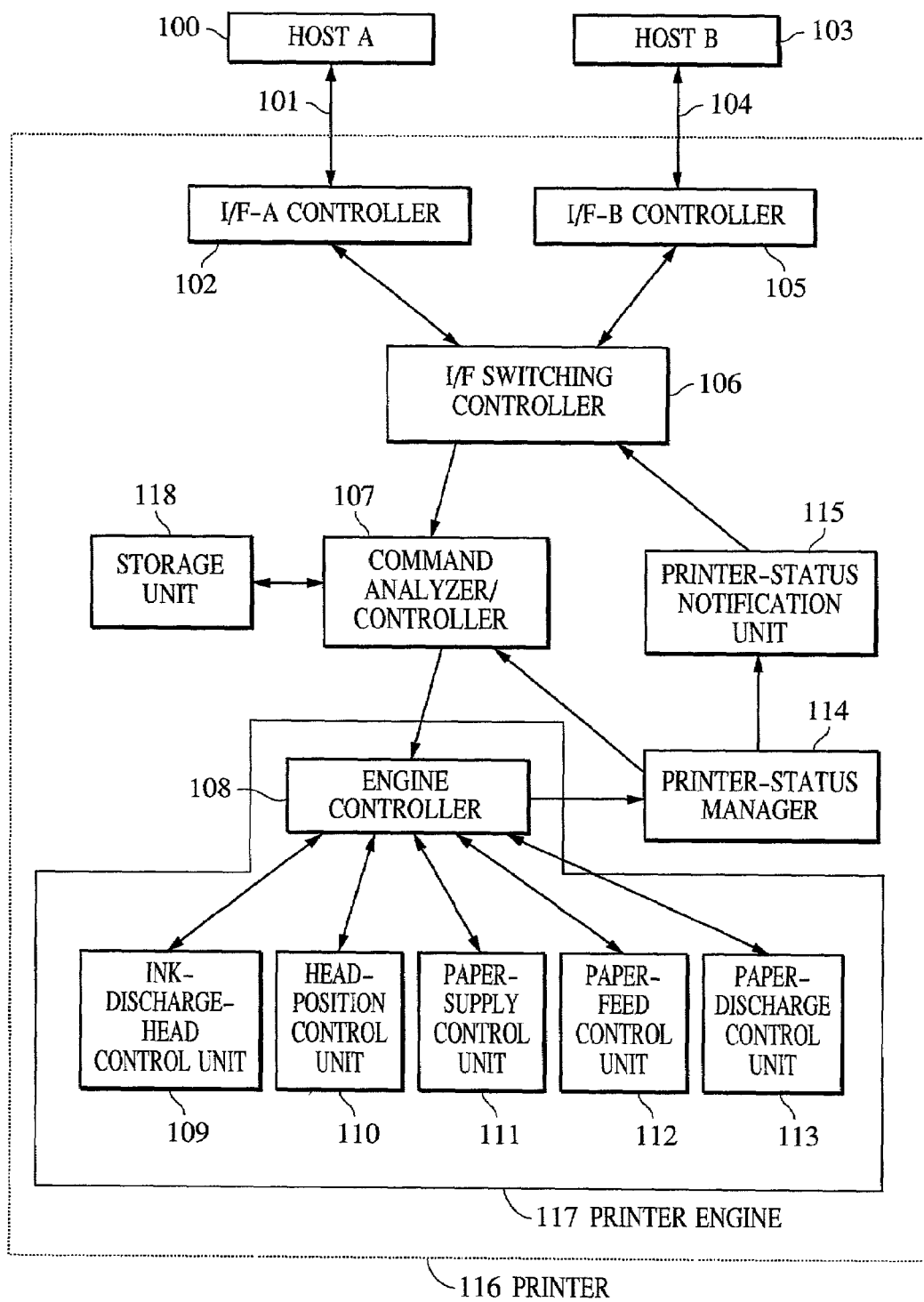
FIG. 1 is a functional block diagram showing a printer apparatus according to an embodiment of the present invention.

FIG. 1 is a functional block diagram of a control system in a printer according to an embodiment of the present invention.

FIG. 1 shows host units A (100) and B (103) (simply indicated by "HOST A" and "HOST B" in FIG. 1), and a printer 116 according to an embodiment of the present invention. In this embodiment, the printer 116 is an ink-jet printer.

The printer 116 is linked to the host units A and B via interfaces A (101) and B (104). Each of the interfaces A (101) and B (104) is, for example, a Centronics interface, a USB (universal serial bus) interface, an IEEE 1394 interface for packet communication or another type of network interface, or a wireless interface using radio waves or infrared radiation, such as a Bluetooth or IrDA (Infrared Data Association) interface.

The control system in the printer 116 has the following structure.

An interface-A controller 102 and an interface-B controller 105 respectively communicate with the host units A (100) and B (103) by performing processing based the protocols of the interfaces A (101) and B (104).

In order that the interfaces A (101) and B (104) may be switched for selectively using either of them, an interface switching controller 106 switches the interface-A controller 102 and the interface-B controller 105 and links either of them to a command analyzer/controller 107 and a printer-status notification unit 115 at the subsequent stage.

The command analyzer/controller 107 analyzes a control command in print data received from the host unit A (100) or B (103) via the interface A (101) or B (104) that is selected by the interface switching controller 106, and converts the control command into an engine-control command for controlling a printer engine 117 (printing mechanism unit) to perform operations in accordance with the control command. The engine-control command is output to an engine controller 108 in the printer engine 117.

The command analyzer/controller 107 is specifically formed by a central processing unit. The command analyzer/controller 107 analyzes the control command in accordance with a control program stored in the random access memory (RAM) of a storage unit 118, and controls the printer 116 in accordance with the result of the analysis. The controlling includes control processes indicated by the flowcharts shown in FIGS. 2 and 3, which will be described later. The RAM of the storage unit 118 corresponds to a computer-readable storage medium containing a control program for the printer 116, in which the storage medium and the control program are in accordance with embodiments of the present invention.

The command analyzer/controller 107 uses the RAM of the storage unit 118 as a work area for performing various information processes such as command analysis. Part of the RAM is used as a receiving buffer for temporarily storing print data received from the host unit A (100) or B (103).

The engine controller 108 receives the engine-control command from the command analyzer/controller 107, and performs paper-supply, printing, or paper-discharging operations by controlling an ink-discharge-head control unit 109, a head-position control unit 110, a paper-supply control unit 111, a paper-feed control unit 112, and a paper-discharge control unit 113.

In response to an instruction from the engine controller 108, the ink-discharge-head control unit 109 controls a bubble-jet head (not shown) as a recording head to discharge ink by supplying power to the heater of the bubble-jet head.

The head-position control unit 110 controls the position of the bubble-jet head by using a pulse motor or the like to move a carriage on which the bubble-jet head is mounted.

The paper-supply control unit 111 controls the driving of a motor as a paper-supply-mechanism driver, whereby cut-sheet paper is supplied from a paper-supply cassette (not shown) mounted on the printer 116 or a manual paper-supply portion (not shown) of the printer 116.

The paper-feed control unit 112 controls the driving of a motor as the driver of a paper-feeding mechanism for feeding a supplied sheet of paper in the printer 116, whereby the supplied sheet is fed.

The paper-discharge control unit 113 performs paper discharging by controlling the driving of a motor as the driver of a paper-discharge mechanism for discharging a printed sheet from the printer 116.

A printer-status manager 114 posts, to both the command analyzer/controller 107 and a printer-status notification unit 115, the status of the printer 116 which is posted from the engine controller 108.

The printer-status notification unit 115 posts the status of the printer 116 to the host unit A (100) or B (103) via the interface switching controller 106.

Next, with reference to the flowchart of FIG. 2, a control process by the command analyzer/controller 107 and which is described below. The control process includes a process for coping with a case in which an interface cable is disconnected (interface link is broken) while print data being received from the host unit A (100) or B (103) via the interface A (101) or B (104) is being printed in the construction in FIG. 1.

Figure 2:
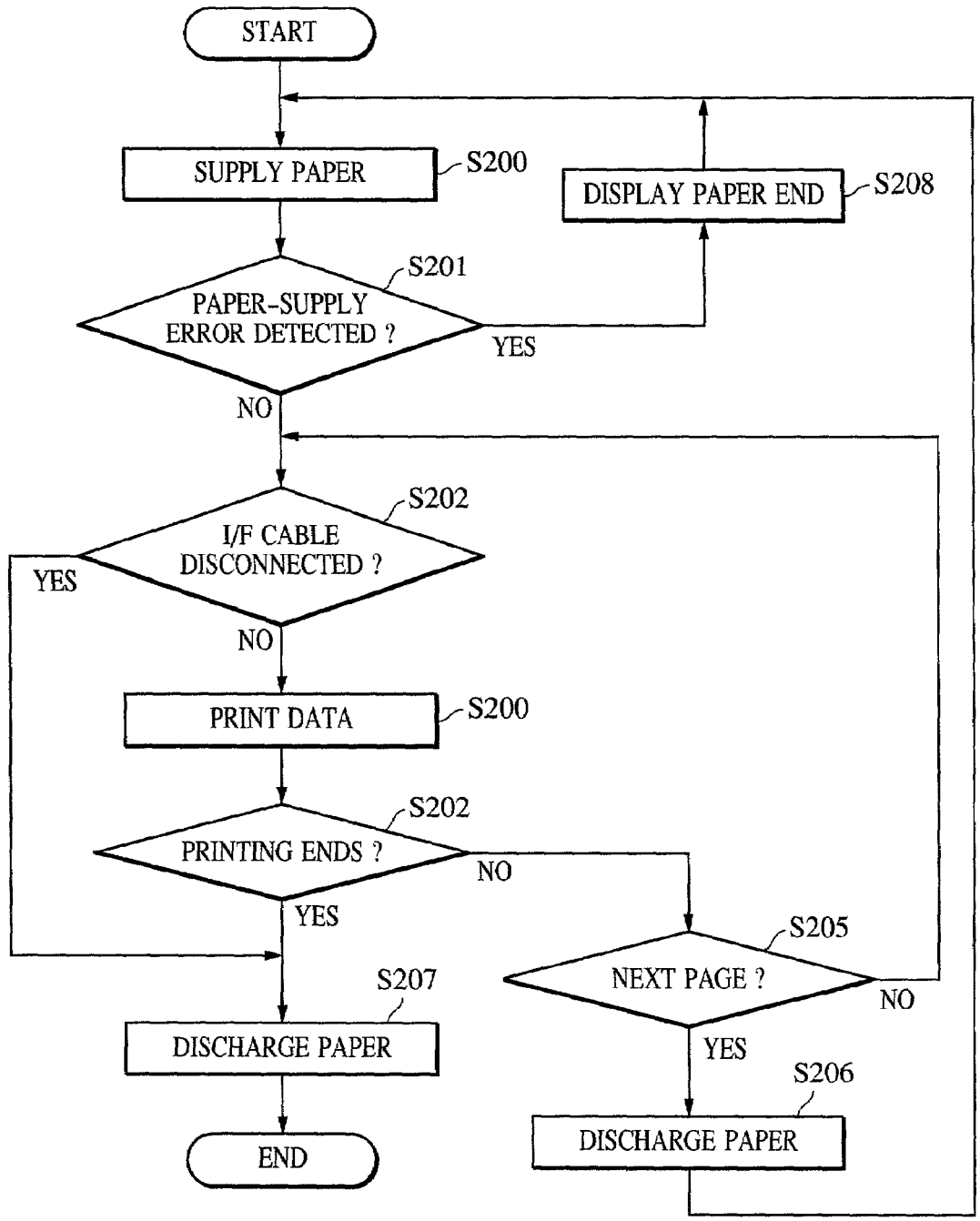
FIG. 2 is a flowchart showing a process that controls the printer apparatus shown in FIG. 1 and that includes a process performed when an interface cable is disconnected while the printer apparatus is printing.

Upon receiving print data from the host unit A (100) or B (103) via the interface A (101) or B (104), the command analyzer/controller 107 initiates the process in FIG. 2. In step S200, when detecting a paper-supply command from the received print data, the command analyzer/controller 107 transmits a paper-supply command to the engine controller 108 instructing it to perform paper-supply operations.

In step S201, the command analyzer/controller 107 determines whether a paper-supply error has been posted from the printer engine 117 via the printer-status manager 114. If a paper-supply error has been posted, the command analyzer/controller 107 proceeds to step S208, and instructs a display unit on an operation panel (not shown) of the printer 116 to display a notification informing the user of a paper-end status. After that, the command analyzer/controller 107 goes back to step S200, and instructs the engine controller 108 to perform paper-supply operations.

In step S201, after the command analyzer/controller 107 has determined whether or not the paper-supply error has posted, the command analyzer/controller 107 proceeds to step S202, and detects about whether or not the cable of either the interface A (101) or B (104), which is being used, is disconnected (whether link by the interface is broken). A specific method for the determination will be described later.

If the cable is not disconnected, the command analyzer/controller 107 proceeds to step S203, and instructs the engine controller 108 to perform printing of print data on paper.

In step S204, the command analyzer/controller 107 determines whether printing has terminated in accordance with a printing-job-terminating command. If the command analyzer/controller 107 has determined that the printing is not terminated, the command analyzer/controller 107 proceeds to step S205.

In step S205, the command analyzer/controller 107 determines whether paper must be fed to form a new page. If the command analyzer/controller 107 has determined that paper must be fed to form a new page, the command analyzer/controller 107 instructs the engine controller 108 to discharge the printed sheet in step S206, and subsequently goes back to step S200 for supplying paper again. After that, the command analyzer/controller 107 repeats step S201 and the subsequent steps.

In step S205, if the determination result is negative, the command analyzer/controller 107 goes back to step S202, and repeats step S202 and the subsequent steps.

In step S204, if the command analyzer/controller 107 has determined that printing has terminated, the command analyzer/controller 107 instructs the engine controller 108 to discharge the printed sheet in step S207, and terminates the process.

In step S202, if disconnection of the interface cable which is being used is detected, the command analyzer/controller 107 jumps to step S207, and the printed sheet is discharged with the printing immediately terminated in order to complete the process. At this time, any print data remaining in the receiving buffer of the storage unit 118 is erased.

However, step S207 may be modified so that, after printing all print data remaining in the receiving buffer, the printing is terminated and the printed sheet is discharged.

According to the above-described control process, when one interface is disconnected in process of printing print data received via the interface, printing of print data received via the interface is terminated and the printed sheet is discharged. This prevents the printing of print data on a remaining sheet when the print data is received via the other interface. In addition, when recognizing disconnection of one interface, a host unit that corresponds to the interface terminates printing due to time-out, and regards the printing as error processing. When the interface is linked again, the host unit transmits new print data. Also in this case, the print data can be printed on a new sheet of paper since the previous sheet does not remain.

A specific method for detecting the disconnection of the interface cable in step S202 is described below.

When a Centronics interface is used as the interface that is being used, in step S202, it is determined whether no control command has not been received for a predetermined period from the corresponding host unit via the Centronics interface. If no control command has been received, this situation is regarded as a state in which the interface cable is disconnected. If a control command has been received, this situation is regarded as a state in which the interface cable is not disconnected (connection is broken).

When a Universal Serial Bus (USB) interface is used as the interface that is being used, in step S202, it is determined whether the USB interface is suspended, in other words, whether the positive and negative data signals of the USB interface have been at high level for a period or longer. If the USB interface is suspended, this condition is regarded as a state in which the interface cable is disconnected. If not, such a condition is regarded as a state in which the interface cable is not disconnected.

When a packet-communication interface is used as the interface that is being used, in step S202, a situation in which packets to be received for a predetermined period have not been received for the predetermined period is regarded as a state in which the interface cable is disconnected. The details of the process in step S202 are shown as steps S2021 to S2024 shown in FIG. 3.

Figure 3:
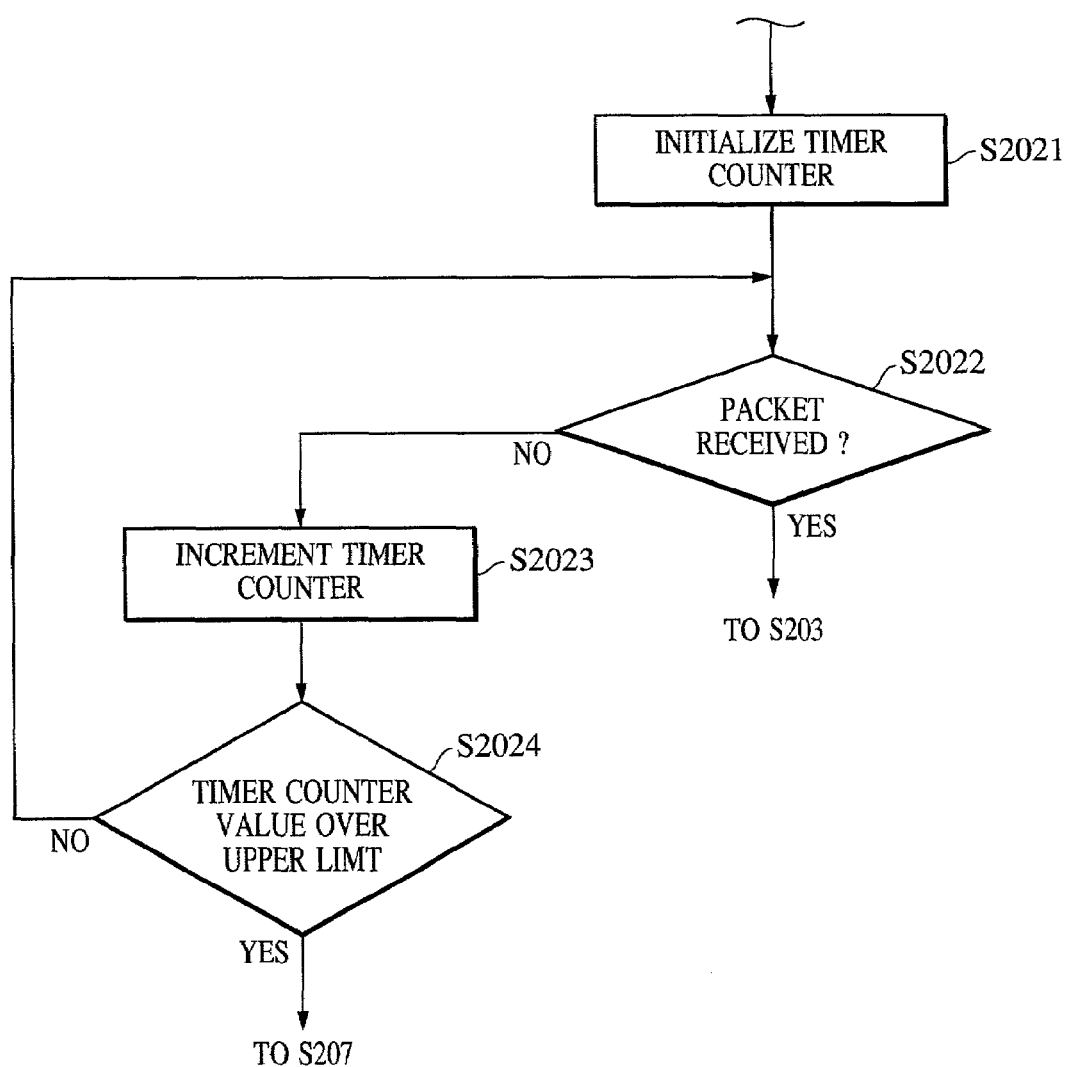
FIG. 3 is a detailed flowchart showing the step S202 shown in FIG. 2 which is performed when the interface cable is for packet communication.

Referring to FIG. 3, in step S2021, a timer counter (not shown) that measures time intervals for receiving packets is initialized. In step S2022, it is determined whether packets have been received. If the packets have been received, this condition is regarded as a state in which the interface cable is not disconnected. The process proceeds to step S203 in FIG. 2. In step S2022, if the packets have not been received, the value of the counter is incremented in step S2033, and in step S2024, it is determined whether the counter value exceeds an upper limit corresponding to the predetermined period, in other words, whether the packets have not been received for the predetermined period or longer. If the counter value does not exceed the upper limit, the process goes back to step S2022, and the subsequent steps are repeatedly performed. If the counter value exceeds the upper limit, this condition is regarded as a state in which the interface cable is disconnected, and the process proceeds to step S207.

As described above, in this embodiment, while print data, received from either of the host units A (100) and B (103) via either of the interfaces A (101) and B (104), is being printed, when disconnection of the interface cable is detected, the printing is terminated and the printed paper is discharged. Accordingly, when print data, received from the other host unit via the other interface, is printed in a manual-feeding mode, no paper remains in the in-apparatus paper-feeding path since even the last page at the termination of the printing has already been discharged. Therefore, differently from a conventional case, it is not necessary for the user to perform operations for discharging the remaining paper before manually feeding paper, or to extract the remaining paper. In addition, a possibility is eliminated that printing may fail due to the next printing initiated from part of the remaining paper since the user fails to notice the remaining paper, so that the printing can be performed without fail.

Upon detecting the disconnection of the interface cable that is being used, the command analyzer/controller 107 performs control processing in which printing is unconditionally terminated and the printed paper is discharged, as described above. However, in accordance with the type of paper for printing, the command analyzer/controller 107 may determine whether to perform control processing on the termination of printing and paper discharging in accordance with the disconnection of the interface cable. For example, in a case in which the type of paper for printing is expensive special paper, if the paper is discharged in the middle of printing, and cannot be used for printing, the paper cost increases. Accordingly, the command analyzer/controller 107 is not allowed to perform the control processing on the termination of printing and paper discharging in accordance with the disconnection of the interface cable. In this case, the printing remains interrupted in accordance with the disconnection of the interface cable, and the printing of print data received via another interface is prohibited, whereby paper is not uselessly consumed since the disconnected interface cable is linked again for restarting printing.

In response to a specified control command received from either host unit, or in response to a specified input from an operation unit (not shown) of the printer 116, the command analyzer/controller 107 may determine to perform the control processing on the termination of printing and paper discharging in accordance with the disconnection of the interface cable.

These can be easily implemented by changing the control program of the command analyzer/controller 107 which is stored in the ROM of the storage unit 118.

In the above-described embodiment, the disconnection of the interface cable (interface link) is a type of interface error. Thus, the detection of the disconnection of the interface cable in step S202 (FIG. 2) may be changed to the detection of an interface error. The control process shown in FIG. 2 can be applied to interface errors other than disconnection of an interface link. The interface errors other than disconnection of an interface link include a communication error in which, when the interfaces 101 and 104 are wireless interfaces that perform communication using radio waves and infrared radiation, such as Bluetooth and IrDA interfaces, communication cannot be established due to an excessive communication range and the existence of an obstacle. In this case, the error detection in step S202 is performed such that the printer 116 is notified of error when communication error is detected in the wireless interface as either the interface 101 or 104, and the error notification controls the command analyzer/controller 107 to detect interface error.

Other Embodiments

Figure 4:
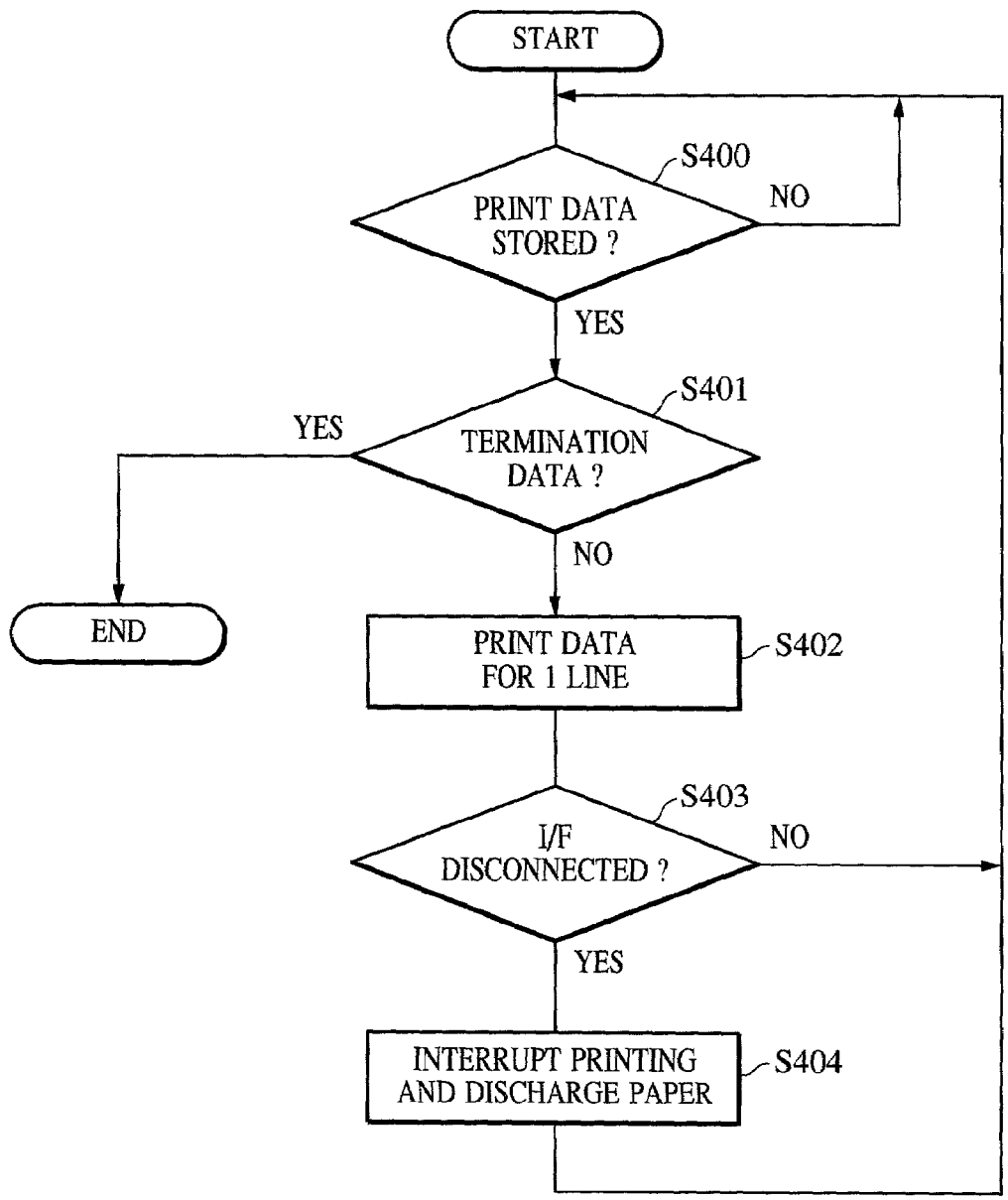
FIG. 4 is a flowchart showing a process that controls the printer apparatus shown in FIG. 1 and that includes a process performed when an interface cable is disconnected while the printer apparatus is printing

FIG. 4 is a flowchart of a control process for a case in which, when one interface is used to perform printing, the interface is disconnected, and the other interface is used to perform printing by another user.

A program corresponding to the control process in FIG. 4 is stored in the ROM of the storage unit 118, and is executed by the CPU of the command analyzer/controller 107.

In step S400, the process determines whether print data is stored. If the process has determined that the print data is stored, the process proceeds to step S401. If the process has determined that the print data is not stored, the process goes back to step S400.

In step S401, the process determines whether the print data is termination data. If the process has determined that the print data is termination data, the process ends. If the process has determined that the predetermined is not termination data, the process proceeds to step S402.

In step S402, the process performs printing of the print data for one line, and proceeds to step S403. In step S402, the process determines whether paper is supplied before the printing is performed. If no paper is supplied, paper is supplied.

In step S403, the process determines whether the interface is disconnected. If the process has determined that the interface is not disconnected, the process goes back to step S400. If the process has determined that the interface is disconnected, the process proceeds to step S404.

In step S404, the process interrupts the printing, discharges the paper, and goes back to step S400.

Next, an example of a process for a case in which, when a plurality of users use a plurality of interfaces to perform printing, one interface corresponding to the first user among the users is disconnected. For printing by the first user, in step S400, the process determines whether print data is stored. If the print data is stored, the process proceeds to step S401. In step S401, the process determines whether the print data is termination data. If the print data is termination data, the process proceeds to "YES" in step S401 for termination.

In step S401, if the print data is not termination data, the process proceeds to "NO", the process performs the printing of the print data for one line. If the present invention is not employed, step S403 is skipped, so that the process goes back to step S400. At this time, in step S400, if print data other than the termination data is not received and stored, the process proceeds to "NO" for performing step S400 to await print data, so that the process loops in step S400 unless receiving print data. Thus, in a printer in which the present invention is not employed, incompletely-printed paper remains held in a paper-feeding unit.

When, in this condition, print data is received via another interface by another user, paper feeding is performed in order to print the print data for one line. However, because the remaining paper has remained in a paper-feed path, printing is initiated from part of the remaining paper. Otherwise, when new paper is supplied for new printing, paper jamming occurs which makes it impossible to perform printing.

In a case in which the present invention is employed, it is determined whether the interface cable is disconnected in step S403, and if the interface cable is disconnected, in step S404, printing is interrupted and paper is discharged, whereby paper used by the first user is discharged beforehand, and print data from the next user can be printed on new paper in step S402. Otherwise, if paper is fed for printing print data from the next user in step S402, the present invention operates so that paper can be fed without paper jamming because incompletely-printed paper does not remain held in the paper-feeding unit.

As is clear from the foregoing description, according to the foregoing embodiments, in a printer apparatus which are linked to a plurality of host units via a plurality of interfaces and which selectively uses the interfaces to receive print data from one of the host units so that the print data is printed on cut-sheet paper by a single printing mechanism, the printing is terminated when disconnection of the selected interface or another type of error is detected during the printing process, and the paper is discharged. Therefore, when another interface which is not disconnected, or which is free of error other than disconnection, is used to receive print data in order that printing is performed in a mode in paper is manually fed, it is not required, differently from a conventional printer apparatus, for the user to initially perform operations for discharging paper remaining in a paper-feed path of the apparatus before manually feeding paper, or to extract the remaining paper. In addition, according to the present invention, a preferable effect can be obtained in that, if the next printing is initiated from part of the remaining paper, it can be completed without fail.

As described above, according to the present invention, if an interface link is broken during a printing process, by terminating the printing and discharging paper, subsequently received print data can be appropriately printed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printer apparatus, comprising:
   detection means for detecting an interface-disconnection state; and
   control means for performing control processing in which, when said detection means detects the interface-disconnection state during a printing process, the printing is terminated and paper is discharged,
   wherein said control means determines, in accordance with the type of paper used for printing, whether or not control processing is performed in response to the detection of the interface-disconnection state by said detection means.

2. A method for controlling a printer apparatus, comprising:
   a detection step for detecting an interface-disconnection state during a printing process; and
   a control step for performing control processing in which, when said detection step detects the interface-disconnection state during the printing process, the printing is terminated and paper is discharged,
   wherein said control step determines, in accordance with the type of paper used for printing, whether or not control processing is performed in response to the detection of the interface-disconnection state by said detection step.

3. A control program stored on a recording medium readable by a computer provided in a printer apparatus, said control program comprising:
   a detection step for detecting an interface-disconnection state during a printing process; and
   a control step for performing control processing in which, when said detection step detects the interface-disconnection state during the printing process, the printing is terminated and paper is discharged,
   wherein said control step determines, in accordance with the type of paper used for printing, whether or not control processing is performed in response to the detection of the interface-disconnection state by said detection step.

* * * * *

UNITED STATES PATENT AND TRADEMARK OFFICE
CERTIFICATE OF CORRECTION

PATENT NO. : 6,995,851 B2  Page 1 of 1
APPLICATION NO. : 09/843722
DATED : February 7, 2006
INVENTOR(S) : Kazuya Sakamoto It is certified that error appears in the above-identified patent and that said Letters Patent is hereby corrected as shown below:

TITLE PAGE:
(57) ABSTRACT, Line 6, "plurality" should read -- a plurality --.

COLUMN 3:
Line 67, "printing" should read -- printing. --.

COLUMN 5:
Line 58, "link" should read -- the link --.

COLUMN 7:
Line 11, "step S2033" should read -- step S2023 --.

COLUMN 8:
Line 38, "predetermined" should read -- print data --; and
Line 63, ""NO"," should read -- "NO", the --.

COLUMN 9:
Line 26, "which are" should read -- which is --; and
Line 37, "paper" should read -- which paper --.

Signed and Sealed this

Twenty-eighth Day of November, 2006

JON W. DUDAS
*Director of the United States Patent and Trademark Office*